(12) United States Patent
Wang et al.

(10) Patent No.: US 10,956,035 B2
(45) Date of Patent: Mar. 23, 2021

(54) TRIGGERING DISPLAY OF APPLICATION

(71) Applicant: INTERNATIONAL BUSINESS MACHINES CORPORATION, Armonk, NY (US)

(72) Inventors: Yu Wang, Beijing (CN); Yi Xiao, ShangHai (CN); Guang Yang, Beijing (CN); Jia Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

(21) Appl. No.: 16/128,693

(22) Filed: Sep. 12, 2018

(65) Prior Publication Data

US 2018/0373427 A1    Dec. 27, 2018

Related U.S. Application Data

(63) Continuation of application No. 14/884,083, filed on Oct. 15, 2015, now Pat. No. 10,126,944.

(30) Foreign Application Priority Data

Oct. 17, 2014 (CN) .......................... 201410551222.2

(51) Int. Cl.
*G06F 3/0488* (2013.01)
*G06F 3/0484* (2013.01)
*G06F 3/01* (2006.01)

(52) U.S. Cl.
CPC ...... *G06F 3/04886* (2013.01); *G06F 3/04842* (2013.01); *G06F 3/04883* (2013.01)

(58) Field of Classification Search
CPC combination set(s) only.
See application file for complete search history.

(56) References Cited

U.S. PATENT DOCUMENTS 8,677,284 B2    3/2014 Aguilar
2007/0008338 A1*   1/2007 Kim ................... G09G 5/14
345/629

(Continued)

FOREIGN PATENT DOCUMENTS

CN    101609387 A    12/2009
CN    101968362 A    2/2011

(Continued)

OTHER PUBLICATIONS

Anonymous, "A System for Interacting With Multiple Applications Simultaneously on Touch Screen Displays", IP.com, IP.com No. 000208323, published Jul. 1, 2011 (4 pages).

(Continued)

*Primary Examiner* — Nhat Huy T Nguyen
(74) *Attorney, Agent, or Firm* — Alexander Jochym; Matthew M. Hulihan; Heslin Rothenberg Farley & Mesiti PC (57) ABSTRACT

Triggering display of an application includes initially presenting a first interface, including an interface of a parent application, on a display screen and in response to receiving a gesture denoting an approximate closed region or a closed region, determining a non-full-screen display region corresponding to the gesture on the display screen. Based on the parent application being displayed as part of the first interface when receiving the gesture, identifying child application(s) of the parent application, the child application(s) being deemed relevant to the parent application, and displaying shortcut(s) of the child application(s) in the non-full-screen display region, and in response to a user selecting one of the shortcut(s), launching a child application corresponding to the selected shortcut and displaying an interface of the child application in the non-full-screen display region.

20 Claims, 5 Drawing Sheets

(56) References Cited

U.S. PATENT DOCUMENTS

| | | | |
|---|---|---|---|
| 2007/0180400 A1 | 8/2007 | Zotov | |
| 2010/0085384 A1* | 4/2010 | Kim | G06F 3/0488 345/660 |
| 2010/0241958 A1 | 9/2010 | Fish | |
| 2011/0107272 A1* | 5/2011 | Aguilar | G06F 3/04815 715/853 |
| 2012/0293433 A1* | 11/2012 | Yamamoto | G06F 3/0412 345/173 |
| 2013/0120295 A1 | 5/2013 | Kim et al. | |
| 2013/0187861 A1 | 7/2013 | Lavallee | |
| 2013/0263042 A1 | 10/2013 | Buening | |
| 2013/0326415 A1* | 12/2013 | Park | G06F 3/04817 715/835 |
| 2014/0164989 A1 | 6/2014 | Kuhne | |
| 2014/0362007 A1* | 12/2014 | Jung | G06F 3/04883 345/173 |
| 2016/0110100 A1 | 4/2016 | Wang et al. | |

FOREIGN PATENT DOCUMENTS

| | | |
|---|---|---|
| CN | 102165415 A | 8/2011 |
| CN | 102968269 A | 3/2013 |
| CN | 103324436 A | 9/2013 |
| CN | 103870115 A | 6/2014 |
| CN | 103870123 B | 6/2014 |

OTHER PUBLICATIONS

Anonymous, "Method and User Interface for Managing Multiple Windows on a Multi-Touch Display Surface", IP.com, IP.com No. 000224208, published Dec. 13, 2012 (4 pages).

List of IBM Patents or Applications Treated as Related, Sep. 12, 2018, 2 pgs.

* cited by examiner

TRIGGERING DISPLAY OF APPLICATION

BACKGROUND

The present invention relates to the field of computer user interfaces, and more specifically, to a method and a system for triggering display of an application.

Figure 2:
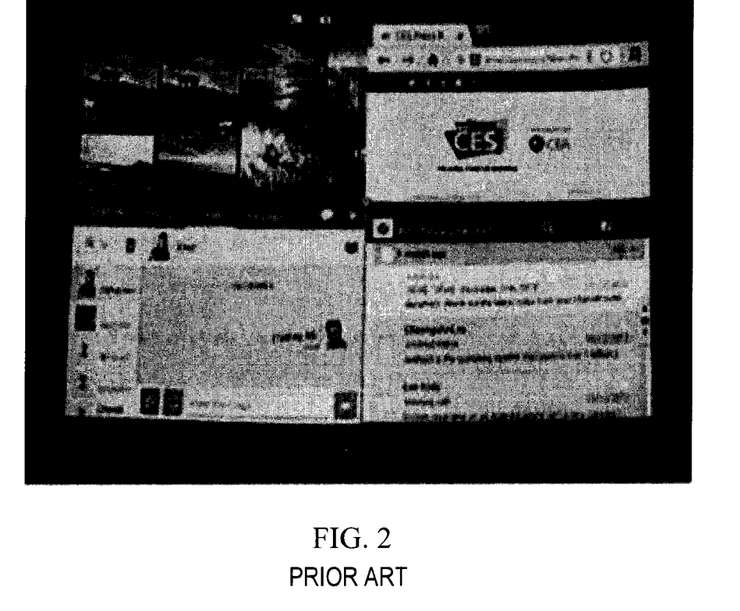
FIG. 2 illustrates an exemplary screenshot of a multi-task system display on a smart device in the prior art.

A touch screen in a smart device has become more and more widespread, and multi-task systems have been achieved in some smart devices. Existing multi-task systems usually utilize a split screen layout to display interfaces of multiple applications. FIG. 2 illustrates a screenshot of an example of multi-task system of a smart device in the prior art. In the screenshot of the smart device shown in FIG. 2, interfaces of multiple (for example, 4) applications are displayed simultaneously, and interfaces of the 4 applications occupy ¼ of the screen respectively. This split screen layout is predefined, and the position and size of the interface of each individual application that is initially displayed are fixed and cannot be defined by a user, thereby lacking flexibility.

In addition, in smart devices of the prior art, operation of triggering such split screen display of multiple applications is troublesome. For example, in a case where only a first application at the upper left corner in FIG. 2 is executed in the smart device (at this time, the interface of the first application is displayed in a full screen), if a second application at the upper right corner in FIG. 2 is to be launched to be executed simultaneously with the first application, firstly, it may be necessary, at this time, to return to the desktop of the system by e.g., pressing the Home key of the smart device or performing other operations. Then, if there are multiple pages of the desktop, it is also necessary to slide the desktop to turn pages to find the shortcut of the second application. When the shortcut of the second application is found, the second application is launched by tapping the shortcut of the second application on the current page of the desktop such that the second application and the first application are displayed in a split screen. At this time, the first application and the second application may occupy, for example, a half screen, respectively. If a third application and a fourth application at the lower part in FIG. 2 are also launched and executed simultaneously, it is necessary to repeat the above operations in order, that is, pressing the Home key, sliding the desktop multiple times, tapping the corresponding shortcut. As shown in FIG. 2, interfaces of the first application to the fourth application displayed through the above operations are shown. Here, display positions and sizes of interfaces of respective applications are predefined and fixed, and cannot be specified by the user. In addition, such a method of triggering display-in-one-screen of multiple tasks needs to perform operations of many steps, thereby making the user's operation overcomplicated.

SUMMARY

According to an aspect of the present invention, a method is provided for triggering display of an application. The method includes: in response to receiving a gesture denoting an approximate closed region or a closed region on a display screen, determining a non-full-screen display region corresponding to the gesture on the display screen; displaying shortcuts of at least one application in the non-full-screen display region; and in response to a user selecting one of the shortcuts, launching a first application corresponding to the selected shortcut and displaying an interface of the first application in the non-full-screen display region.

According to another aspect of the present invention, a system is provided for triggering display of an application. The system includes a memory, and a processing device communicatively coupled to the memory. The system performs a method, which includes: in response to receiving a gesture denoting an approximate closed region or a closed region on a display screen, determining a non-full-screen display region corresponding to the gesture on the display screen; displaying shortcuts of at least one application in the non-full-screen display region; and in response to a user selecting one of the shortcuts, launching a first application corresponding to the selected shortcut and displaying an interface of the first application in the non-full-screen display region.

BRIEF DESCRIPTION OF THE DRAWINGS

Through a more detailed description of the one or more embodiments of the present disclosure depicted in the accompanying drawings, the present disclosure will become more apparent, where the same reference generally refers to the same component in different figures, and wherein.

DETAILED DESCRIPTION

One or more aspects of the present invention are described below in more detail with reference to the accompanying drawings. Note, in this regard, that the present disclosure can be implemented in various manners, and thus should not be construed to be limited to the embodiments depicted herein.

Since the method of launching an application by tapping the shortcut on the desktop has become a commonly used operation manner for a user to launch an application, few people can think of improving this. However, through research, it has been found that, by changing this commonly used operation manner, the flexibility of enabling a user to freely determine the display region of the launched application can be achieved. Also, display-in-one-screen of multiple applications can be triggered more easily.

In view of the initially-described problems, the present invention aims at providing a method and a system for triggering display of an application in which the flexibility of enabling the user to freely determine the display region of the launched application can be achieved. In addition, the method and the system for triggering display of an application according to the present invention can also trigger display-in-one-screen of multiple applications more easily.

Figure 1:
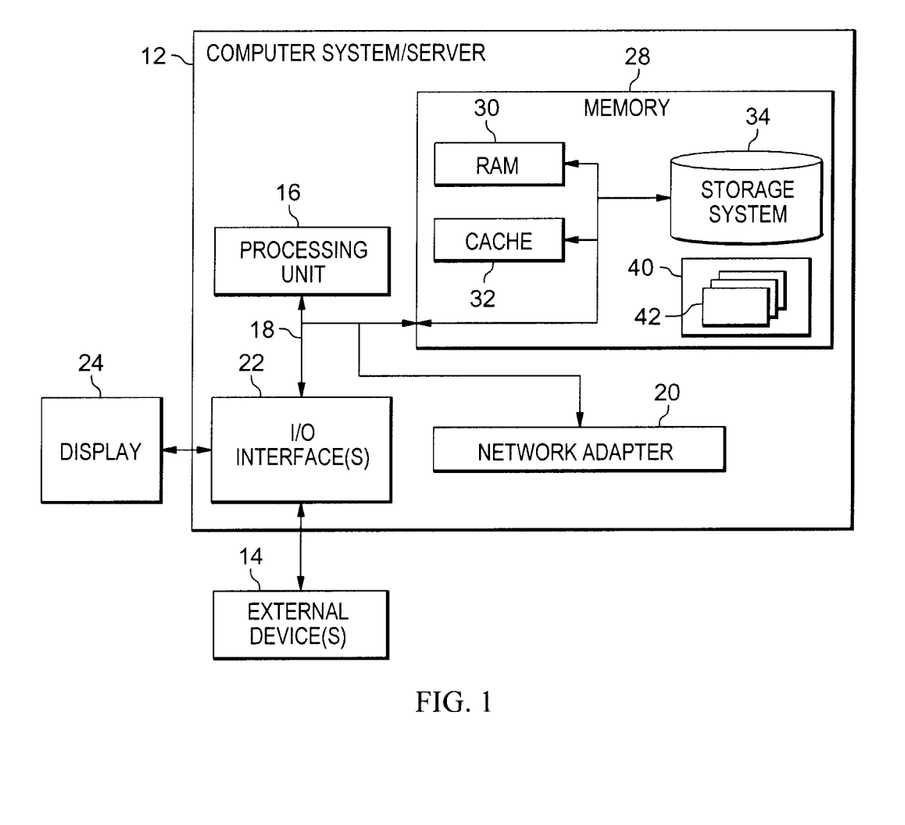
FIG. 1 shows an exemplary computer system or server 12, which may implement one or more aspects of the present invention.

Refer now to FIG. 1, where an exemplary computer system/server 12 is shown, which may implement one or more aspects of the present invention. Note that computer system/server 12 is provided by way of illustration only, and is not intended to suggest any limitation as to the scope of use or functionality of embodiments of the invention described herein.

As shown in FIG. 1, computer system/server 12 is shown in the form of a general-purpose computing device. The components of computer system/server 12 may include, but not be limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
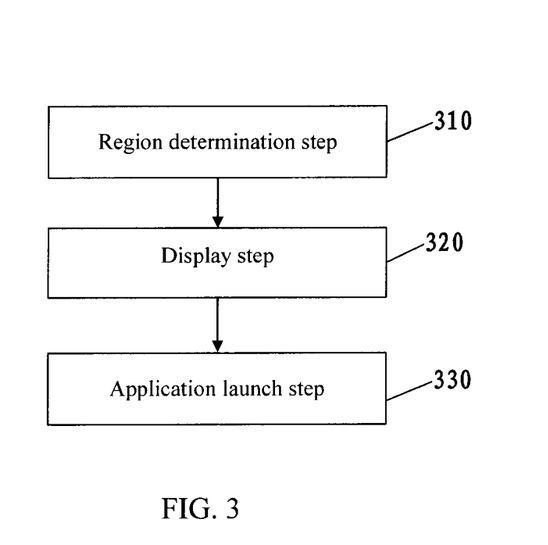
FIG. 3 is a flowchart illustrating a method for triggering display of an application according to one or more aspects of the present invention.

With reference now to FIG. 3, a flowchart is shown illustrating one embodiment of a method 300 for triggering display of an application, according to one or more aspects of the present invention. As shown in FIG. 3, method 300 may include a region determination step 310, a display step 320 and an application launch step 330. Hereinafter, respective steps of the method 300 are explained in detail.

In the region determination step 310, in response to receiving a gesture denoting an approximate closed region or a closed region on a display screen, a non-full-screen display region corresponding to the gesture is determined on the display screen. Here, the display screen is included in an electronic device, and the electronic device may be an electronic device such as a smart phone, a tablet, a laptop or a desktop computer, etc. A user may make the gesture with a pointer which may be a touch pen, a finger or a mouse pointer, etc. In one embodiment, the display screen itself is covered with a touch device and forms a touch screen together with the touch device, and a user makes a gesture by touching the touch screen. In another embodiment, a user may make a gesture by touching a touch device which is separate from the display screen (e.g., a touchpad). In another embodiment, a user may also make a gesture by manipulating a mouse (hereinafter, an action of the user drawing a trace on a display screen by manipulating a mouse is also considered one of gestures).

In the region determination step 310, determination of the non-full-screen display region is triggered in response to the user's gesture, and the user's gesture is made in a state where the electronic device displays a first interface on its display screen. In one or more embodiments, the interface displayed on the display screen before receiving the gesture (the first interface) may be the desktop of the operating system. That is, when the display screen displays the desktop of the operating system, the user makes a specific gesture with a pointer, which may trigger execution of the method 300. In one or more other embodiments, when the electronic device is executing an application (i.e., a second application mentioned below), the first interface includes the interface of this application. In this state, the user makes a specific gesture with a pointer, which may also trigger execution of the method 300. In addition, the gesture may be pinch with fingers or may be drawing a trace with a finger, a touch pen or a mouse pointer.

In one or more embodiments, the gesture is a pinch, where the user makes a pinch gesture with two fingers on the touch device. This gesture may denote e.g., a rectangle (i.e., a closed region). For example, contact points of these two fingers with the touch device may be determined as diagonal apexes of the rectangle such that position and size of the rectangle are determined. As these two fingers pinch out, the rectangle will become larger; and as these two fingers pinch in, the rectangle will become smaller. Alternatively, this gesture may denote e.g., a circle (i.e., a closed region). For example, contact points of these two fingers with the touch device may be determined as two ends of the diameter of the circle such that position and size of the circle are determined. As these two fingers pinch out, the circle will become larger; and as these two fingers pinch in, the circle will become smaller. When the fingers leave the touch device, the gesture is completed, and based on final contact points of these two fingers with the touch device before the fingers leave the touch device, a non-full-screen display region corresponding to the gesture is determined on the display screen. In such an embodiment, the closed region denoted by the gesture is the determined non-full-screen display region. Here, although only examples of a rectangle and a circle are given as above, the non-full-screen display region may also include an ellipse, a square, etc. In one or more embodiments, the non-full-screen display region determined by the pinch gesture may be adjusted, e.g., to prevent the non-full-screen display region from going beyond the boundary of the display screen.

Figure 4:
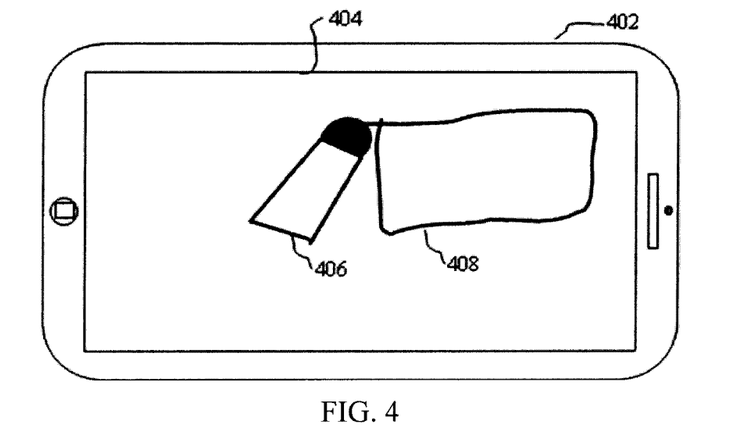
FIG. 4 illustrates an example of drawing a trace on a display screen of an electronic device implementing one or more aspects of the present invention.

In one or more other embodiments, the gesture is drawing a trace, including drawing a trace with a pointer such as a finger, a touch pen or a mouse pointer, etc. FIG. 4 illustrates an example of drawing a trace on a display screen 404 of an electronic device 402. In the example shown in FIG. 4, for convenience of explanation, a finger is used as the pointer for explanation, and in the depicted example, the user drew a trace 408 with a finger 406. In this embodiment, it is necessary to detect and record the trace through which the finger goes, for example, record the trace as consecutive coordinate points. While detecting and recording the trace, it is judged whether the trace through which the user uses the pointer to go on the touch device forms an approximate closed region or a closed region. Specifically, for example, by detecting whether a point where a trace arrives later overlaps with a coordinate of a former point in the trace, it may be judged that whether the trace forms a closed region. For example, in a case where there is no overlapping point in the trace, by detecting that the ratio of the smallest distance (i.e., the opening) between a point where the trace ends and other points in the trace to the length of the trace itself is smaller than a threshold, it may be judged that the trace forms an approximate closed region. The trace 408 in FIG. 4 contains an overlapping point, thus it is judged that it forms a closed region. Here, only a simple method of judging whether a trace forms a closed region or an approximate closed region is given, but the present invention is not limited thereto, and it is also possible to employ other graphical algorithms well known in the art to achieve the same goal.

Figure 5:
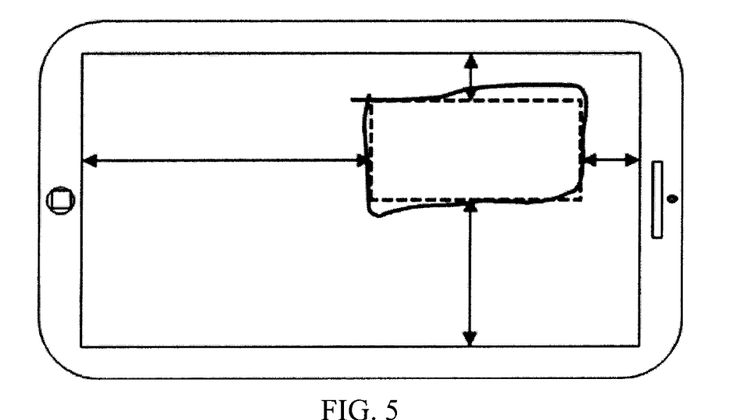
FIG. 5 illustrates calculation and adjustment of a closed region formed by the trace in FIG. 4 to obtain a non-full-screen display region having a regular shape, in accordance with one or more aspects of the present invention.

In this embodiment, determining the non-full-screen display region corresponding to the gesture on the display screen includes performing calculation and adjustment based on an approximate closed region or a closed region denoted by the gesture to obtain the non-full-screen display region having a regular shape. FIG. 5 illustrates the non-full-screen display region having a regular shape obtained by performing calculation and adjustment on the closed region formed by the trace 408 in FIG. 4. In FIG. 5, the trace 408 forms a closed region and is indicated by a solid line (a hand-drawn rectangle), and the non-full-screen display region after calculation and adjustment is indicated by a dotted line. In one example, it may be judged whether a segment of a trace is approximate to a line segment based on the dispersion of the X coordinate or the Y coordinate of each point in the segment of the trace. When the dispersion of the X coordinate of each point in the segment of the trace is smaller than a specific threshold, the segment of the trace may be assumed to be a line segment vertical to the X axis of the display screen; and when the dispersion of the Y coordinate of each point in the segment of the trace is smaller than a specific threshold, the segment of the trace may be assumed to be a line segment vertical to the Y axis of the display screen. In the example shown in FIG. 5, the trace 408 is judged to contain four segments of traces (equivalent to four sides of the hand-drawn rectangle). Then, for two segments of traces at the top side and the bottom side, averages of Y coordinates thereof are calculated respectively so as to obtain Y coordinates of the top side and the bottom side of the rectangular non-full-screen display region; and for two segments of traces at the left side and the right side, averages of X coordinates thereof are calculated respectively so as to obtain X coordinates of the left side and the right side of the rectangular non-full-screen display region. Here, only a simple example of calculating and adjusting a hand-drawn shape to obtain a regular shape is given. However, the present invention is not limited thereto, and it is also possible to employ other graphical algorithms well known in the art to recognize the hand-drawn shapes, such as the K-segment principal curve algorithm, etc. In addition, the regular shape recognized from the hand-drawn shape is not limited to a rectangle, and may also include a circle, an ellipse, a square, etc. In the end, in the region determination step 310, for example, the non-full-screen display region indicated by the dotted line shown in FIG. 5 is determined. For a case where a touch pen or a mouse pointer, etc. is used as a pointer, similar to the above case where the finger is used as a pointer, the non-full-screen display region corresponding to the made gesture is determined.

Figure 6:
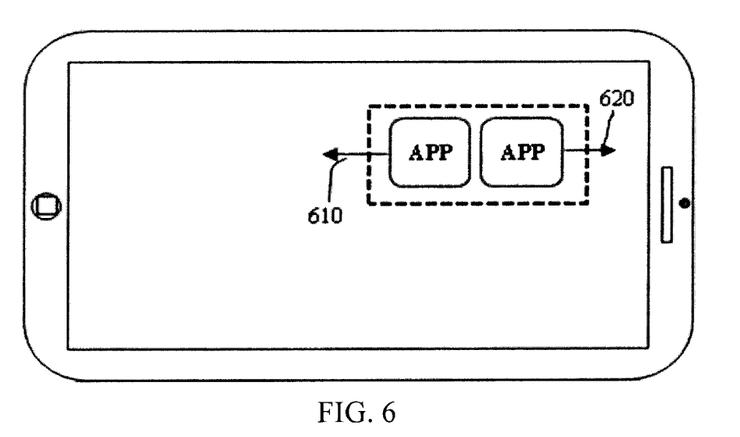
FIG. 6 illustrates an example of displaying shortcuts of at least one application in a non-full-screen display region, according to one or more aspects of the present invention.

Next, in the display step 320, shortcuts of at least one application are displayed in the non-full-screen display region. FIG. 6 illustrates an example of displaying shortcuts of at least one application in a non-full-screen display region according to an embodiment of the present invention. In FIG. 6, as one example, shortcuts of two applications are displayed in a non-full-screen display region indicated by a dotted line.

In one embodiment according to the present invention, displaying shortcuts of at least one application in the non-full-screen display region includes displaying shortcuts of most all applications installed in the electronic device in the non-full-screen display region. The number of shortcuts displayed in the non-full-screen display region is not limited by the example in FIG. 6, but will be limited by the size of the non-full-screen display region. Consequently, it is possible to display only a part of shortcuts. When it is not possible to display all shortcuts in the non-full-screen display region, it is necessary to slide in the non-full-screen display region with a pointer to display other shortcuts which are not displayed.

Taking the case in FIG. 6 as an example, when the user uses a pointer such as a finger to slide to the left along an arrow 610 in the non-full-screen display region, shortcuts displayed in the region will also slide to the left such that originally displayed shortcuts disappear and new shortcuts appear from the right side for selection by the user. Likewise, when the user uses a pointer such as a finger to slide to the right along an arrow 620 in the non-full-screen display region, shortcuts displayed in the region will also slide to the right such that originally displayed shortcuts disappear and new shortcuts appear from the left side for selection by the user. FIG. 6 gives only an example, and the present invention is not limited thereto. In another embodiment, a method of sliding up and down may also be employed.

In the one or more embodiments mentioned above, when the electronic device is executing an application (i.e., a second application), the first interface includes the interface of this application. In this state, the user determines a non-full-screen display region by making a specific gesture. In this embodiment, it is assumed that a portion outside the dotted line frame (the non-full-screen display region) in FIG. 6 is displaying the interface of the second application. In this embodiment, displaying shortcuts of at least one application in the non-full-screen display region includes displaying only shortcuts of applications relevant to the second application in the non-full-screen display region. Hereinafter, an application (i.e., the second application) within the interface of which a gesture is made to open a non-full-screen display region is referred to as a parent application, and an application (i.e., a first application to be described in detail in the following step 330) to be launched by selecting a shortcut in the non-full-screen display region is referred to as a child application. In this embodiment, the child application to be launched is relevant to the parent application being executed. For example, the meaning of being relevant includes: when the parent application is a shopping application, the child application may be a payment application; when the parent application is a photographing application, the child application may be a photo beautifying application; and so on. Here, only several examples are given, relevance of applications is not limited to these examples. Relevance of an application with other applications may be automatically or manually stored in storage of an electronic device when the application is installed. In this way, when the parent application is executed, if a gesture is made to open a non-full-screen display region, according to stored relevance of the application, only shortcuts of applications relevant to the parent application are displayed in the non-full-screen display region to select the child application thereof rather than displaying shortcuts of all installed applications. By doing so, operation efficiency can be improved, and user experience can be improved. Generally, the number of relevant applications of one application is not large, and by employing the present embodiment, it is possible to reduce the number of times slide in the non-full-screen display region significantly, thereby reducing time taken for looking for a desired shortcut. Of course, in one or more embodiments, even when there is a parent application, shortcuts of all installed applications may also be displayed in the non-full-screen display region.

Next, in the application launch step 330, in response to a user selecting one of the shortcuts with a pointer, a first application corresponding to the selected shortcut is launched and the interface of the first application is displayed in the non-full-screen display region. In a case where there is a parent application, the first application is the child application of the parent application and is relevant to the parent application. In one or more embodiments, when the parent application owns only one relevant application, the step of displaying shortcuts (step 320) may be skipped, and the relevant application may be started directly in the non-full-screen display region. In addition, in one embodiment according to the present invention, in the step 320, in a state where shortcuts of at least one application are displayed in the non-full-screen display region, if there is not any operation input for a predetermined period of time, the non-full-screen display region will be closed.

In one or more implementations, there may be multiple non-full-screen display regions on the display screen simultaneously. That is, in a case where at least one non-full-screen display region has been already opened by performing steps of the above described method 300, by repeating steps of the method 300, additional non-full-screen display region may also be opened. In a case where there are multiple non-full-screen display regions, automatic adjustment may be performed on the display layout.

In one or more embodiments, in a case where the first interface (i.e., the interface displayed before making the gesture) has contained additional at least one non-full-screen display region, determining the non-full-screen display region corresponding to the gesture on the display screen includes adjusting locations and/or sizes of at least one of the additional at least one non-full-screen display region, the non-full-screen display region being determined and the interface covered by them automatically such that respective non-full-screen display regions do not affect display of the interface covered by them.

Figure 7:
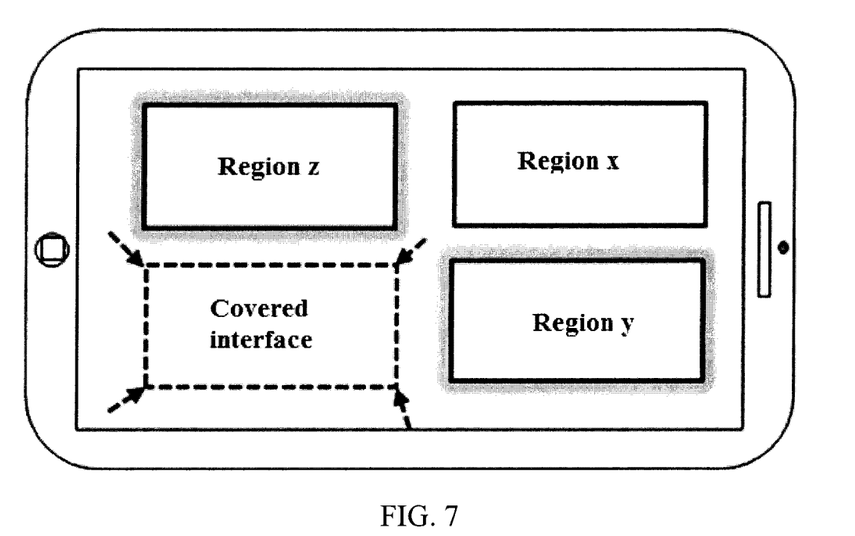
FIG. 7 illustrates an example of an automatic adjustment in a case where there are multiple non-full-screen display regions, according to one or more aspects of the present invention.

FIG. 7 illustrates an example of automatic adjustment in a case where there are multiple non-full-screen display regions according to an embodiment of the present invention. In the example shown in FIG. 7, the covered interface is initially displayed in a full screen. Then, a non-full-screen display region x is opened on the covered interface by the method 300. At this time, the display interface of the display screen corresponds to the above described first interface, and the first interface includes the covered interface displayed in a full screen as well as the non-full-screen display region x covering it. Then, when a non-full-screen display region y is opened by the method 300, it may be judged whether the area of the part of the covered interface which is covered by the region x and the region y exceeds a predetermined ratio or whether important elements in the covered interface are blocked. If the result of judging is yes, then the location and/or size of the covered interface are adjusted, for example, the covered interface is shrunk to be displayed in the left half of the display screen (at this time, the covered interface which is initially displayed in a full screen has become a non-full-screen display region). Then, when a non-full-screen display region z is further opened by the method 300, it may be judged whether the area of the covered interface which is covered by the region x, the region y or the region z exceeds a predetermined ratio or whether important elements in the covered interface are blocked. If the result of judging is yes, the location and/or size of the covered interface are adjusted, for example, the covered interface is shrunk to be displayed in the lower left part of the display screen (as shown in FIG. 7). FIG. 7 gives only a simple example of automatic adjustment. In an embodiment according to the present invention, in addition to the covered interface, locations and/or sizes of the region x, the region y and/or the region z may be adjusted such that respective non-full-screen display regions do not affect display of the interface covered by them. In a simple example, before the non-full-screen display region is determined in the above described step 310, information of other non-full-screen display regions (e.g., including locations, sizes of the regions, or locations, sizes of important elements in the regions, etc.) may be received, and then, in the step 310, automatic adjustment is performed based on the information to determine the non-full-screen display region and other non-full-screen display regions.

Figure 8:
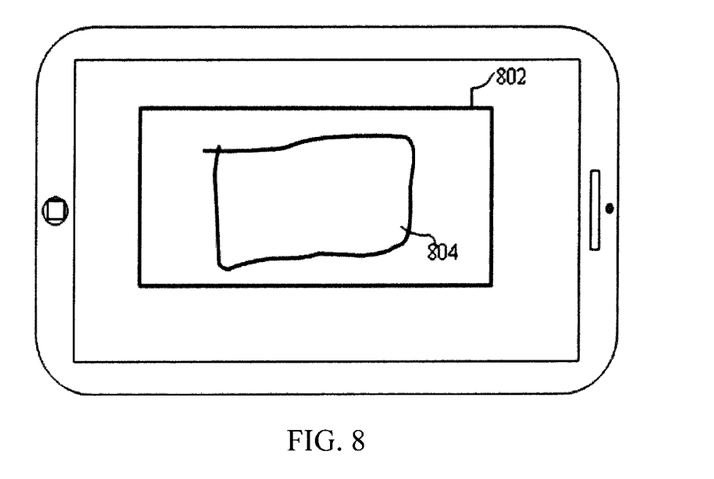
FIG. 8 illustrates an example of drawing a closed region in an existing non-full-screen display region, according to one or more aspects of the present invention.

In one or more embodiments according to the present invention, one non-full-screen display region may be opened in another non-full-screen display region. In the region determination step 310 of the method 300, in a case where it is judged that the approximate closed region or closed region is located within an existing non-full-screen display region, determining the non-full-screen display region corresponding to the gesture on the display screen includes determining the non-full-screen display region corresponding to the gesture within the existing non-full-screen display region on the display screen. FIG. 8 illustrates an example of drawing a closed region in an existing non-full-screen display region according to an embodiment of the present invention. In the example shown in FIG. 8, a non-full-screen display region 802 has been generated by the method 300, and a first application is displayed within the non-full-screen display region 802. At this time, it is possible draw a trace 804 by a pointer such as a finger within the region 802 such that another non-full-screen display region is triggered to be opened. In one or more embodiments, a third application relevant to the first application may be displayed in the another non-full-screen display region.

Figure 9:
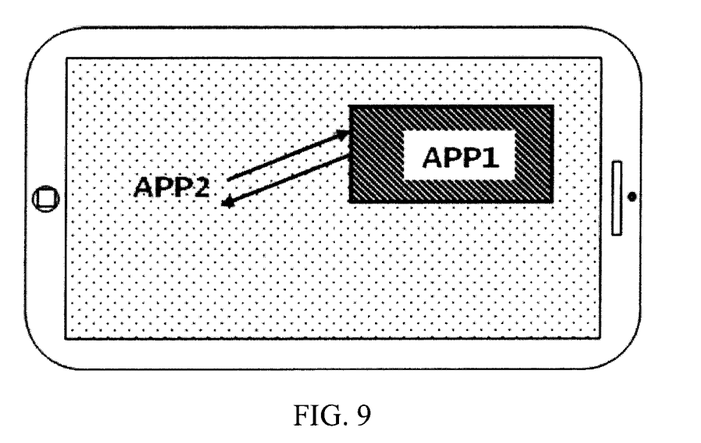
FIG. 9 illustrates an example of swapping display regions of different applications by making a specific gesture, according to one or more aspects of the present invention.

In one or more embodiments, the display regions of the above-described first application and second application can be swapped by making a specific gesture. FIG. 9 illustrates an example of swapping display regions of different applications by making a specific gesture according to an embodiment of the present invention. In the example shown in FIG. 9, for example, by performing a drag operation with fingers, e.g., dragging the application APP1 to the display region of the application APP2 or dragging the application APP2 to the display region of the application APP1, it is possible to achieve swapping of display regions of these two applications. For example, such swapping may be achieved by using a display control interface of operating system level, may be achieved by using a display driver, and may also be achieved by using communication between applications (e.g., exchange of coordinates of display regions).

Figure 10:
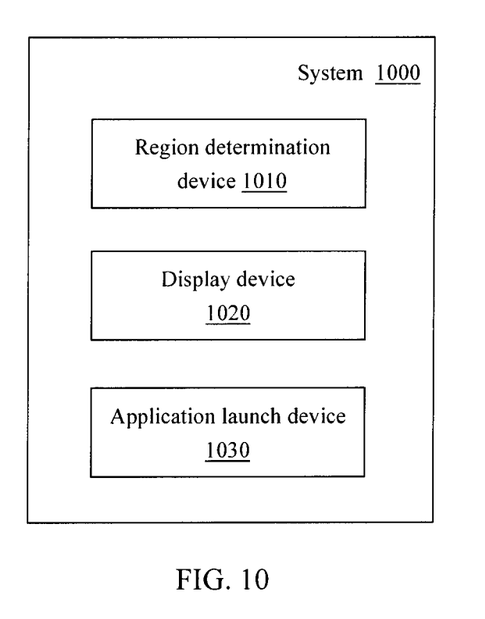
FIG. 10 illustrates a block diagram of a system for triggering display of an application, according to one or more aspects of the present invention.

FIG. 10 illustrates a block diagram of a system 1000 for triggering display of an application according to an embodiment of the present invention. In FIG. 10, the system 1000 includes a region determination device 1010, a display device 1020 and an application launch device 1030. The region determination device 1010 is configured to determine, in response to receiving a gesture denoting an approximate closed region or a closed region on a display screen, a non-full-screen display region corresponding to the gesture on the display screen. The display device 1020 is configured to display shortcuts of at least one application in the non-full-screen display region. The application launch device 1030 is configured to launch, in response to a user selecting one of the shortcuts, a first application corresponding to the selected shortcut and display the interface of the first application in the non-full-screen display region.

In one embodiment according to the present invention, the gesture is pinch with fingers or drawing a trace with a finger, a touch pen or a mouse pointer.

In one embodiment according to the present invention, the region determination device is further configured to perform calculation and adjustment based on the approximate closed region or the closed region denoted by the gesture to obtain the non-full-screen display region having a regular shape.

In one embodiment according to the present invention, a first interface displayed on the display screen before receiving the gesture is the desktop of operating system; and in another embodiment, the first interface includes an interface of a second application different from the first application.

In one embodiment according to the present invention, the display device is further configured to display shortcuts of all applications installed in an electronic device including the display screen in the non-full-screen display region.

In one embodiment according to the present invention, the display device is further configured to display only shortcuts of applications relevant to the second application in the non-full-screen display region.

In one embodiment according to the present invention, the region determination device is further configured to, in a case where the first interface has contained additional at least one non-full-screen display region, adjust locations and/or sizes of at least one of the additional at least one non-full-screen display region, the non-full-screen display region being determined and the first interface automatically such that respective non-full-screen display regions do not affect display of the interface covered by them.

In one embodiment according to the present invention, the region determination device is further configured to, in a case where the approximate closed region or closed region is located within an existing non-full-screen display region, determine the non-full-screen display region corresponding to the gesture within the existing non-full-screen display region on the display screen.

In one embodiment according to the present invention, the display regions of the first application and the second application can be swapped by making a specific gesture.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for triggering display of an application on a computer system, the method comprising:

initially presenting a first interface on a display screen of the computer system, the first interface comprising an interface of a parent application, and the first interface being displayed in a full screen;

in response to receiving a gesture denoting an approximate closed region or a closed region on the display screen, determining a non-full-screen display region corresponding to the gesture on the display screen;

based on the parent application being displayed as part of the first interface and on the computer system, when receiving the gesture, having prior-stored relevance deeming at least one child application of the parent application relevant to the parent application, identifying the at least one child application of the parent application as being relevant to the parent application based on the prior-stored relevance, and displaying shortcuts of the at least one child application in the non-full-screen display region;

in response to a user selecting one of the shortcuts, launching a child application corresponding to the selected shortcut and displaying an interface of the child application in the non-full-screen display region; and based on properties of multiple non-full-screen display regions in which interfaces of child applications are displayed on the display screen, resizing the first interface to be a smaller size than the full screen and displaying the resized first interface on the display screen along with the multiple non-full-screen display regions.

2. The method of claim 1, wherein the non-full-screen display region is a first non-full-screen display region of the multiple non-full-screen display regions and the multiple non-full-screen display regions further comprises a second non-full-screen display region, and wherein the first interface contains the second non-full-screen display region when the gesture is received, and the determining the first non-full-screen display region corresponding to the gesture, on the display screen comprises adjusting location or size of the first non-full-screen display region determined such that the first and second non-full-screen display regions do not affect display of the first interface.

3. The method of claim 1, wherein the display regions of the child application and the parent application are swapped based on making a pre-set user gesture.

4. The method of claim 1, wherein the displaying shortcuts of at least one child application in the non-full-screen display region comprises displaying shortcuts of two or more child applications, of the parent application, installed in an electronic device which includes the display screen in the non-full-screen display region.

5. The method of claim 1, wherein in a case where the approximate closed region or the closed region is located within an existing non-full-screen display region, the determining the non-full-screen display region corresponding to the gesture on the display screen comprises determining the non-full-screen display region corresponding to the gesture within the existing non-full-screen display region on the display screen.

6. The method of claim 1, wherein the gesture comprises at least one of a pinch with fingers, or drawing a trace with a finger, a touch pen or a mouse pointer.

7. The method of claim 1, wherein the multiple non-full-screen display regions initially at least partially cover the first interface that is displayed in the full screen, wherein the properties of the multiple non-full-screen display regions comprise properties of their coverage of the first interface being displayed in the full screen, and wherein, based on the resizing, the coverage of the first interface by the multiple non-full-screen display regions is changed.

8. A computer system for triggering display of an application on the computer system, the computer system comprising:
a memory; and
a processing device communicatively coupled to the memory, wherein the computer system is configured to perform a method comprising:
initially presenting a first interface on a display screen of the computer system, the first interface comprising an interface of a parent application, and the first interface being displayed in a full screen;
in response to receiving a gesture denoting an approximate closed region or a closed region on the display screen, determining a non-full-screen display region corresponding to the gesture on the display screen;
based on the parent application being displayed as part of the first interface and on the computer system, when receiving the gesture, having prior-stored relevance deeming at least one child application of the parent application relevant to the parent application, identifying the at least one child application of the parent application as being relevant to the parent application based on the prior-stored relevance, and displaying shortcuts of the at least one child application in the non-full-screen display region;
in response to a user selecting one of the shortcuts, launching a child application corresponding to the selected shortcut and displaying an interface of the child application in the non-full-screen display region; and
based on properties of multiple non-full-screen display regions in which interfaces of child applications are displayed on the display screen, resizing the first interface to be a smaller size than the full screen and displaying the resized first interface on the display screen along with the multiple non-full-screen display regions.

9. The system of claim 8, wherein the non-full-screen display region is a first non-full-screen display region of the multiple non-full-screen display regions and the multiple non-full-screen display regions further comprises a second non-full-screen display region, and wherein the first interface contains the second non-full-screen display region, and the determining the first non-full-screen display region, corresponding to the gesture, on the display screen comprises adjusting location or size of the first non-full-screen display region determined such that the first and second non-full-screen display regions do not affect display of the first interface.

10. The system of claim 8, wherein the display regions of the child application and the parent application are swapped based on making a pre-set user gesture.

11. The system of claim 8, wherein the displaying shortcuts of at least one child application in the non-full-screen display region comprises displaying shortcuts of two or more child applications, of the parent application, installed in an electronic device which includes the display screen in the non-full-screen display region.

12. The system of claim 8, wherein in a case where the approximate closed region or the closed region is located within an existing non-full-screen display region, the determining the non-full-screen display region corresponding to the gesture on the display screen comprises determining the non-full-screen display region corresponding to the gesture within the existing non-full-screen display region on the display screen.

13. The system of claim 8, wherein the gesture comprises at least one of a pinch with fingers, or drawing a trace with a finger, a touch pen or a mouse pointer.

14. The system of claim 8, wherein the multiple non-full-screen display regions initially at least partially cover the first interface that is displayed in the full screen, wherein the properties of the multiple non-full-screen display regions comprise properties of their coverage of the first interface being displayed in the full screen, and wherein, based on the resizing, the coverage of the first interface by the multiple non-full-screen display regions is changed.

15. A computer program product for triggering display of an application on a computer system, the computer program product comprising:
a computer readable storage medium readable by a processor and storing instructions for execution to perform a method, the method comprising:
initially presenting a first interface on a display screen of the computer system, the first interface comprising an interface of a parent application, and the first interface being displayed in a full screen;

in response to receiving a gesture denoting an approximate closed region or a closed region on the display screen, determining a non-full-screen display region corresponding to the gesture on the display screen;

based on the parent application being displayed as part of the first interface and on the computer system, when receiving the gesture, having prior-stored relevance deeming at least one child application of the parent application relevant to the parent application, identifying the at least one child application of the parent application as being relevant to the parent application based on the prior-stored relevance, and displaying shortcuts of the at least one child application in the non-full-screen display region;

in response to a user selecting one of the shortcuts, launching a child application corresponding to the selected shortcut and displaying an interface of the child application in the non-full-screen display region; and based on properties of multiple non-full-screen display regions in which interfaces of child applications are displayed on the display screen, resizing the first interface to be a smaller size than the full screen and displaying the resized first interface on the display screen along with the multiple non-full-screen display regions.

16. The computer program product of claim 15, wherein the non-full-screen display region is a first non-full-screen display region of the multiple non-full-screen display regions and the multiple non-full-screen display regions further comprises a second non-full-screen display region, and wherein the first interface contains the second non-full-screen display region, and the determining the first non-full-screen display region, corresponding to the gesture, on the display screen comprises adjusting location or size of the first non-full-screen display region determined such that the first and second non-full-screen display regions do not affect display of the first interface.

17. The computer program product of claim 15, wherein the display regions of the child application and the parent application are swapped based on making a pre-set user gesture.

18. The computer program product of claim 15, wherein the displaying shortcuts of at least one child application in the non-full-screen display region comprises displaying shortcuts of two or more child applications, of the parent application, installed in an electronic device which includes the display screen in the non-full-screen display region.

19. The computer program product of claim 15, wherein in a case where the approximate closed region or the closed region is located within an existing non-full-screen display region, the determining the non-full-screen display region corresponding to the gesture on the display screen comprises determining the non-full-screen display region corresponding to the gesture within the existing non-full-screen display region on the display screen.

20. The computer program product of claim 15, wherein the multiple non-full-screen display regions initially at least partially cover the first interface that is displayed in the full screen, wherein the properties of the multiple non-full-screen display regions comprise properties of their coverage of the first interface being displayed in the full screen, and wherein, based on the resizing, the coverage of the first interface by the multiple non-full-screen display regions is changed.

* * * * *